United States Patent
Chen

(10) Patent No.: US 9,729,068 B2
(45) Date of Patent: Aug. 8, 2017

(54) SWITCHING MODE CONVERTER

(71) Applicant: Silergy Semiconductor Technology (Hangzhou) Ltd., Hangzhou (CN)

(72) Inventor: Wei Chen, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 0 days.

(21) Appl. No.: 15/172,544

(22) Filed: Jun. 3, 2016

(65) Prior Publication Data

US 2016/0359420 A1    Dec. 8, 2016

(30) Foreign Application Priority Data

Jun. 3, 2015 (CN) .......................... 2015 1 0299361

(51) Int. Cl.
*H02M 3/335* (2006.01)
*H05B 33/08* (2006.01)

(52) U.S. Cl.
CPC ... *H02M 3/33523* (2013.01); *H02M 3/33561* (2013.01); *H02M 3/33576* (2013.01); *H05B 33/0815* (2013.01); *H05B 33/0845* (2013.01)

(58) Field of Classification Search
CPC ........... H02M 3/3155; H02M 3/33515; H02M 3/33523; H02M 3/33576; H02M 3/33592
USPC ....................... 363/21.04–21.06, 21.08–21.1, 363/21.12–21.14, 21.16–21.18
See application file for complete search history.

(56) References Cited

U.S. PATENT DOCUMENTS

| 5,986,911 A | * | 11/1999 | Tang | .................. | H02M 3/33561 363/21.04 |
| 6,038,147 A | * | 3/2000 | Jacobs | .............. | H02M 3/33561 363/131 |
| 6,038,150 A | * | 3/2000 | Yee | ................... | H02M 3/33561 363/127 |

(Continued)

FOREIGN PATENT DOCUMENTS

| CN | 101630169 A | 1/2010 |
| CN | 101640476 A | 2/2010 |

(Continued)

*Primary Examiner* — Adolf Berhane
*Assistant Examiner* — Gary Nash
(74) *Attorney, Agent, or Firm* — Westman, Champlin & Koehler, P.A.

(57) ABSTRACT

The present disclosure relates to a switching mode converter. A secondary-side power switch is connected in series in a second output circuit, and an output voltage of a second secondary-side winding is fed back to a first secondary-side winding with a value less than an output voltage of the first secondary-side winding. Thus, a freewheeling current flows completely through the secondary-side winding of the second output circuit when the secondary-side power switch is turned on, and flows through secondary-side windings of other output circuits when the secondary-side power switch is turned off. The freewheeling current flows in a time division manner in each switching cycle for the constant current output circuit and for the constant voltage output circuit. Only one stage of power conversion is needed for multiple constant current/voltage outputs. The switching mode converter increases conversion efficiency, and reduces size because only one group of magnetic components is used.

15 Claims, 7 Drawing Sheets

(56) References Cited

U.S. PATENT DOCUMENTS

| | | | | |
|---|---|---|---|---|
| 6,130,828 | A * | 10/2000 | Rozman | H02M 3/33561 363/21.06 |
| 6,373,722 | B1 * | 4/2002 | Malik | H02M 3/33561 363/16 |
| 8,138,731 | B2 | 3/2012 | Chen | |
| 8,169,798 | B2 * | 5/2012 | Ma | H02M 3/24 363/127 |
| 8,674,669 | B2 | 3/2014 | Chen | |
| 8,854,089 | B2 | 10/2014 | Chen et al. | |
| 9,246,384 | B2 | 1/2016 | Liu et al. | |
| 9,312,785 | B2 | 4/2016 | Zhang | |
| 2003/0090247 | A1 * | 5/2003 | Patel | H02M 3/33561 323/267 |
| 2007/0025031 | A1 * | 2/2007 | Kwon | H02M 3/33561 361/38 |

FOREIGN PATENT DOCUMENTS

| | | |
|---|---|---|
| CN | 102723855 A | 10/2012 |
| CN | 103219901 A | 7/2013 |
| CN | 103546021 A | 1/2014 |

* cited by examiner

SWITCHING MODE CONVERTER

CROSS-REFERENCE TO RELATED APPLICATION

This application claims the benefit of Chinese Patent Application No. 201510299361.5, filed on Jun. 3, 2015, which is incorporated herein by reference in its entirety.

BACKGROUND OF THE DISCLOSURE

Field of the Invention

The disclosure relates to the field of power electronics, and more particularly, to a switching mode converter having multiple output terminals.

Background of the Invention

In conventional techniques, a driving power source for an LED back light typically has multiple output terminals. At least one constant current output port is used for providing a driving current to an LED load, and at least one other constant voltage output port is used for supplying electric energy to the system and other loads.

FIG. 1 is a schematic circuit diagram of an example switching mode converter having multiple output terminals according to the prior art, including a constant voltage output port and a constant current output port. As shown in FIG. 1, the switching mode converter 1 having multiple output terminals provides multiple outputs by a plurality of secondary-side windings of a transformer. Each secondary-side winding is connected to an output circuit. In a constant current output circuit, the secondary-side winding Ns1 is coupled to a primary-side winding Np. A primary-side power switch Q1 is connected in series with the primary-side winding and is controlled to be turned on and off, so that a square wave voltage is generated between two ends of the secondary-side winding Ns1. A diode D1 and a capacitor C1 constitute a rectifier circuit which rectifiers and filters the square wave voltage and provides a relatively constant output voltage Vo1. An inductor L, a power switch Q2, a diode D3 and a capacitor C3 constitute a boost-type switching mode converter, which is connected between the rectifier circuit and an LED load. The boost-type switching mode converter is controlled by a constant current control circuit 11 to convert the voltage Vo1 into a constant output current ILED and supplies it to the LED load. The constant current control circuit 13 generates a control signal in accordance with a current sampling signal Vs1 and a current reference signal Iref. Meanwhile, in the constant voltage output circuit, a secondary-side winding Ns2 is coupled to the primary-side winding Np. A diode D3 and a capacitor C3 constitute a rectifier circuit which rectifies and filters a voltage and provides a constant output voltage Vo2. A voltage sampling signal Vs2 representing the output voltage Vo2 is transferred to the primary side by an optocoupler circuit 11. A constant voltage control circuit 12 controls on and off states of the power switch Q1 in accordance with the voltage sampling signal Vs2 and a reference voltage Vref so that the output voltage Vo2 maintains constant. Thus, the switching mode converter as shown in FIG. 1 provides a constant current output and a constant voltage output by two-stage power stage circuit.

However, the two-stage power conversion in the constant current output circuit increases conversion loss and decreases conversion efficiency. Moreover, the two-stage power circuit needs two magnetic components, which increase a size of the system and are disadvantageous for miniaturization.

SUMMARY OF THE INVENTION

In view of this, the present disclosure provides a switching mode converter which decreases the number of power conversion, increases conversion efficiency, and reduces the number of magnetic components and the size of the system, even in a case that the switching mode converter has multiple output terminals.

According to one aspect of the present disclosure, there is provided a switching mode converter, comprising:

an input circuit having a primary-side winding and a primary-side power switch which are coupled in series between an input terminal and ground;

at least one first output circuit having a first secondary-side winding which is coupled with the primary-side winding;

at least one second output circuit having a second secondary-side winding which is coupled with the primary-side winding, and at least one secondary-side power switch;

a first control circuit which controls the primary-side power switch to be turned on and off to adjust an output parameter of the first output circuit; and a second control circuit which controls the secondary-side power switch to be turned on and off to adjust an output parameter of the second output circuit, wherein the first output circuit and the second output circuit are configured so that the second secondary-side winding feeds back a voltage to the first secondary-side winding with a value less than an output voltage of the first secondary-side winding so that the first output circuit is blocked when the secondary-side power switch is turned on.

Preferably, the primary-side power switch and the secondary-side power switch have the same switching cycle, the second control circuit controls the secondary-side power switch to be turned on for at least a portion of time period during which the primary-side power switch is turned off, so that the output parameter of the second output circuit maintains constant.

Preferably, the second output circuit is a constant current output circuit, further comprising:

a current output port;

a second rectifier circuit being electrically coupled between the current output port and the second secondary-side winding; and a current sampling circuit being connected in series with the second secondary-side winding, wherein the secondary-side power switch is connected in series with the second secondary-side winding, and is controlled to be turned on and off so that the output current maintains constant.

Preferably, the second control circuit is configured to generate a second control signal for controlling the secondary-side power switch in accordance with a current sampling signal, a current reference signal and a first control signal, wherein the current sampling signal is provided by the current sampling circuit, the first control signal controls the primary-side power switch, and the current reference signal represents a desired value of the output current.

Preferably, the second output circuit is a constant current output circuit, further comprising:

the second secondary-side winding; and at least two output branches, each of which comprises a current output port, a second rectifier circuit being electrically coupled between the current output port and a branch input, and a current sampling circuit and the secondary-side power switch which are connected in series with the output branch, wherein the at least two output branches are connected in parallel between two ends of the second secondary-side winding, the secondary-side power switch is controlled to be turned on and off so that an output current of respective one of the at least two output branches maintains constant.

Preferably, the second control circuit comprises at least two control sub-circuits, each of which is configured to generate a second control signal for controlling respective one secondary-side power switch in accordance with a current sampling signal of respective one of the at least two output branches, a current reference signal and a first control signal, wherein the current sampling signal is provided by respective one current sampling circuit, the first control signal controls the primary-side power switch, and the current reference signal represents a desired value of an output current of respective one of the at least two output branches, and wherein the control sub-circuits have the same number as that of the output branches.

Preferably, the first output circuit is a constant voltage output circuit, further comprising:

a voltage output port; and a first rectifier circuit being electrically coupled between the voltage output port and the first secondary-side winding, wherein the primary-side power switch is controlled to be turned on and off so that an output voltage of the first output circuit maintains constant.

Preferably, the second control circuit is further configured to adjust the current reference signal in accordance with a current value adjustment signal.

Preferably, the second output circuit is a constant voltage output circuit, further comprising:

a voltage output port;

a rectifier diode being connected in series with the secondary-side power switch between the voltage output port and the second secondary-side winding; and a filter capacitor being connected in parallel at the voltage output port, wherein the secondary-side power switch is controlled to be turned on and off so that an output voltage of the output terminal maintains constant.

Preferably, the second control circuit is configured to generate a second control signal for controlling the secondary-side power switch in accordance with a voltage sampling signal, a voltage reference signal and a first control signal, wherein the voltage sampling signal represents the output voltage, the first control signal controls the primary-side power switch, and the voltage reference signal represents a desired value of the output voltage.

Preferably, the second output circuit is a constant voltage output circuit, further comprising:

the second secondary-side winding; and at least two output branches, each of which comprises a voltage output port, a rectifier diode and the secondary-side power switch which are connected in series between the voltage output port and an output branch input, and a filter capacitor being connected in parallel at the voltage output port, wherein the at least two output branches are connected in parallel between two ends of the second secondary-side winding, the secondary-side power switch is controlled to be turned on and off so that an output voltage of respective one of the at least two output branches maintains constant.

Preferably, the second control circuit comprises at least two control sub-circuits, each of which is configured to generate a second control signal for controlling respective one secondary-side power switch in accordance with a voltage sampling signal of respective one of the at least two output branches, a voltage reference signal and a first control signal, wherein the voltage sampling signal represents an output voltage of respective one of the at least two output branches, the first control signal controls the primary-side power switch, and the voltage reference signal represents a desired value of the output voltage of respective one of the at least two output branches, and wherein the control sub-circuits have the same number as that of the output branches.

Preferably, the switching mode converter comprises only one first output circuit which is a constant current output circuit and further comprises:

a current output port;

a first rectifier circuit being electrically coupled between the first secondary-side winding and the current output port; and a current sampling circuit being connected in series with the first secondary-side winding, wherein the primary-side power switch is controlled to be turned on and off so that an output current maintains constant.

Preferably, the first control circuit is further configured to adjust the current reference signal in accordance with a current value adjustment signal.

A secondary-side power switch is connected in series in a second output circuit, and an output voltage of a second secondary-side winding is fed back to a first secondary-side winding with a value less than an output voltage of the first secondary-side winding. Thus, a freewheeling current flows completely through the secondary-side winding of the second output circuit when the secondary-side power switch is turned on, and flows through secondary-side windings of other output circuits when the secondary-side power switch is turned off. The freewheeling current flows in a time division manner in each switching cycle for the constant current output circuit and for the constant voltage output circuit. Only one stage of power conversion is needed for multiple constant current/voltage outputs. The switching mode converter increases conversion efficiency, and reduces size because only one group of magnetic components are used.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF THE INVENTION

Reference will now be made in detail to particular embodiments of the disclosure, it will be understood that the scope of the present invention is not limited to these embodiments. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
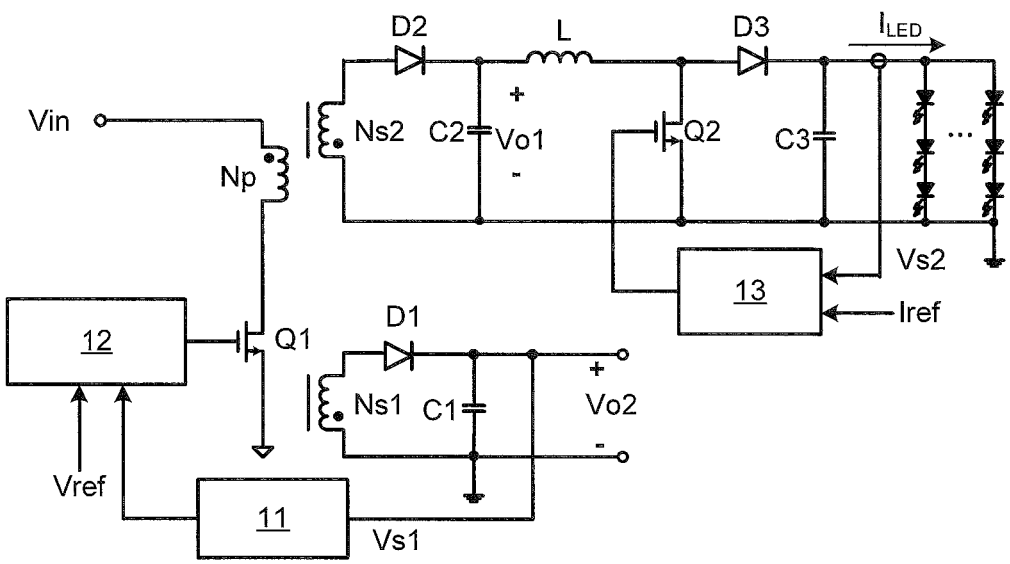
FIG. 1 is a schematic circuit diagram of an example switching mode converter having multiple output terminals according to the prior art, including a constant voltage output port and a constant current output port.
Figure 2:
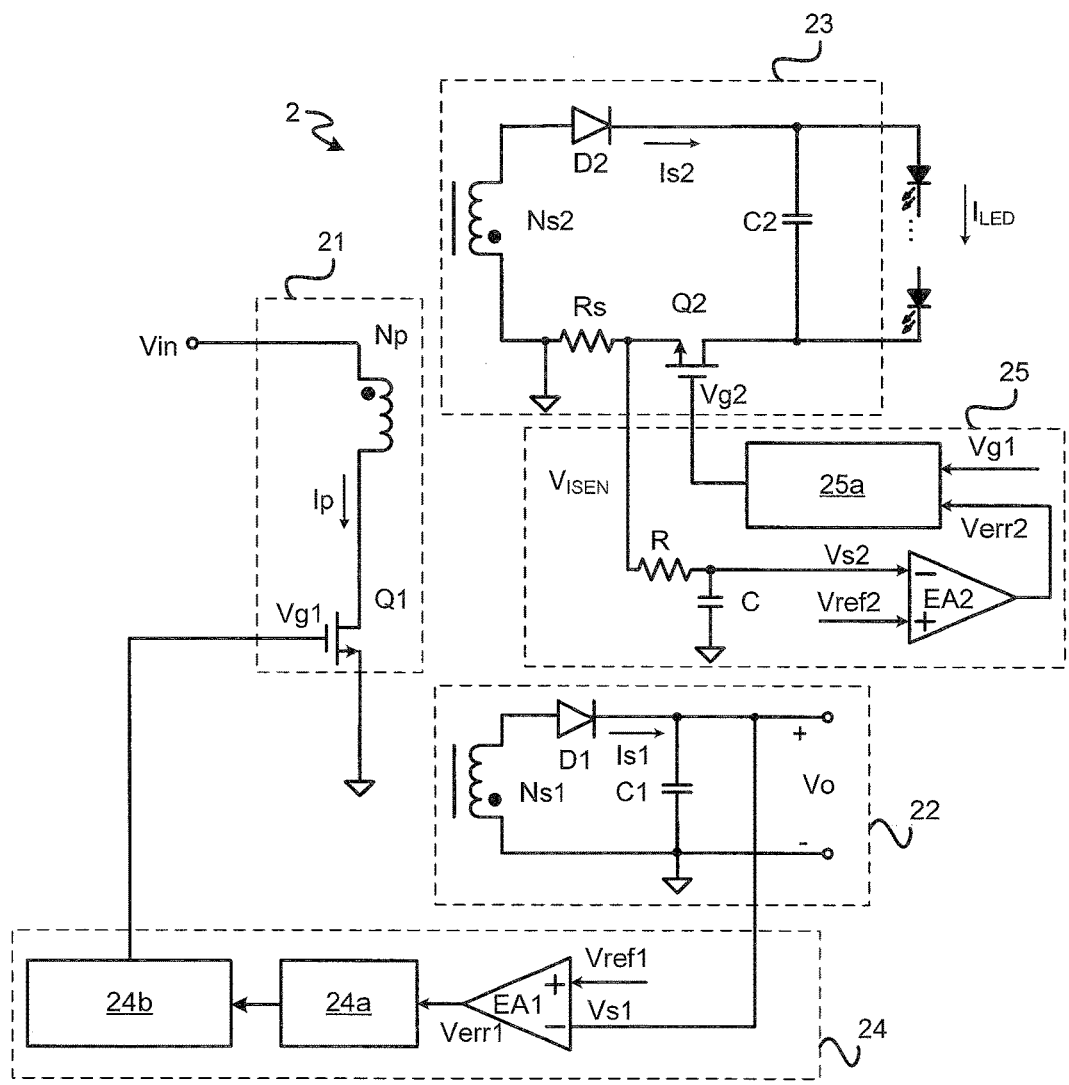
FIG. 2 is a schematic circuit diagram of an example switching mode converter according to a first embodiment of the present disclosure.

FIG. 2 is a schematic circuit diagram of an example switching mode converter according to a first embodiment of the present disclosure. As shown in FIG. 2, the switching mode converter 2 includes an input circuit 21, at least one first output circuit 22, at least one second output circuit 23, a first control circuit 24 and a second control circuit 25.

The input circuit 21 includes a primary-side winding Np and a primary-side power switch Q1. The primary-side winding Np and the primary-side power switch Q1 are connected in parallel between an input terminal and ground. A voltage Vin at the input terminal is obtained from an AC voltage after being rectified by a rectifier bridge and then filtered by an input capacitor.

In the embodiment, the first output circuit 22 is a constant voltage output circuit, and the second output circuit 23 is a constant current output circuit.

The first output circuit 22 is similar to a conventional constant voltage output circuit, having a first secondary-side winding Ns1 which is coupled with the primary-side winding Np. The second output circuit 23 has a second secondary-side winding Ns2 which is coupled with the primary-side winding Np. The primary-side winding Np, the first secondary-side winding Ns1 and the second secondary-side winding Ns2 constitute a transformer.

Further in the embodiment, the second output circuit 23 includes a secondary-side power switch Q2 which is connected in series therein. When the secondary-side power switch Q2 is turned on, the second output circuit 23 is at least partially conducted, and in the embodiment, is completely conducted. When the secondary-side power switch Q2 is turned off, the second output circuit 23 is at least partially blocked, and in the embodiment, is completely blocked.

In the embodiment, the first output circuit 22 and the second output circuit 23 are configured so that the secondary-side winding Ns2 feeds back a voltage to the first secondary-side winding Ns1 with a value less than an output voltage of the first secondary-side winding Ns1, so that the first output circuit 22 is blocked by a rectifier device (i.e. a diode D1 in the rectifier circuit) when the secondary-side power switch Q2 is turned on. That is, a freewheeling current flowing through the first output circuit is zero or near zero. It can be achieved by adjusting a turns ratio of the first secondary-side winding Ns1 and the second secondary-side winding Ns2, or the like. Due to an effect of electromagnetic induction, a voltage between two ends of the first secondary-side winding Ns1 and a voltage between two ends of the second secondary-side winding Ns2 increase when the primary-side power switch Q1 is turned off. When the second output circuit 23 is conducted, i.e. the secondary-side power switch Q2 is turned on, the output voltage of the second secondary-side winding Ns2 feeds back a first voltage with a value less than that of the output voltage of the first secondary-side winding Ns1, and the diode D2 is turned on when the voltage across the second secondary-side winding Ns2 reaches the output voltage. The freewheeling current starts to flow in the second output circuit 23. Meanwhile, the voltage which is fed back to the first secondary-side winding Ns1 does not reach its output voltage. Thus, the diode D1 is turned off, and the first output circuit 22 is blocked. Because energy accumulated in the magnetic component is released by the second secondary-side winding, there is still no a freewheeling current flowing through the firs secondary-side windings Ns1. Thus, the energy which is accumulated in the primary-side winding Np is preferable to be released through a circuit which is connected to the second secondary-side winding, i.e. the second output circuit 23. Thus, the freewheeling current flowing through the first output circuit 22 is zero or nearly zero. When the second output circuit 23 is blocked, i.e. the secondary power switch Q2 is turned off, the primary-side winding Np releases energy through the first output circuit 22, and the freewheeling current flows through the first output circuit 22. Thus, the freewheeling current flows through the constant current output circuit and the constant voltage output circuit in a time division manner by controlling the secondary-side power switch Q2 to be turned on and off.

The first output circuit 22 is a constant voltage output circuit, and has a first secondary-side winding Ns1, a voltage output port and a first rectifier circuit. The first rectifier circuit is electrically coupled between the voltage output port and the first secondary-side winding Ns1, and has a diode D1 and a capacitor C1.

Meanwhile, the first control circuit 24 controls the primary-side power switch Q1 to be turned on and off to adjust an output parameter (i.e. an output voltage Vo) of the first output circuit 22.

Specifically, the first control circuit 24 obtains a voltage sampling signal Vs1 by sampling the output voltage Vo, obtains an error compensation signal Verr1 in accordance with the voltage reference signal Vref1 which represents the output voltage and the voltage sampling signal Vs1, and generates a switching control signal Vg1 in accordance with the error compensation signal Verr1, for controlling the primary-side power switch Q1 to maintain the voltage Vo constant.

The first control circuit 24 may include a first error amplifier circuit EA1, an optocoupler circuit 24a, and a first control signal generating circuit 24b. The first error amplifier circuit EA1 generates the error compensation signal Verr1 in accordance with the voltage sampling signal Vs1 and the voltage reference signal Vref1. The optocoupler circuit 24a transfers the error compensation signal Verr1 from the secondary side to the primary side, specifically to the first control signal generating circuit 24b, in an optocoupling manner. The first control signal generating circuit 24b generates the control signal Vg1 in accordance with the error compensation signal Verr1, for controlling the power switch Q1.

It should be understood that the structure of the first control circuit 24 is shown only as an example. Any control circuit that controls the primary-side power switch in accordance with the output voltage to provide a constant voltage output is applicable in the embodiment.

The second output circuit 23 is a constant current output circuit, and has a second secondary-side winding Ns2, a current output port, a second rectifier circuit, a current sampling circuit Rs and secondary-side power switch Q2. The second rectifier circuit is electrically coupled between the current output port and the second secondary-side winding Ns2. The second rectifier circuit includes a diode D2 and a capacitor C2.

The current sampling circuit Rs and the secondary-side power switch Q2 are connected in series in the constant current output circuit, i.e. being connected in series with the second secondary-side winding Ns2. As shown in FIG. 2, the current sampling circuit Rs is preferably a sampling resistor which is connected between ground and a first terminal of the secondary-side power switch Q2. A second terminal of the secondary-side power switch Q2 is connected with one terminal of the current output port. In the embodiment, the constant current output circuit is connected to an LED load. The LED load is connected to the current output port, and may be integrated with the whole switching mode converter. It should be understood that the current sampling circuit may be connected to other portions of the constant current output circuit. The current sampling signal $V_{ISEN}$ which represents current value can be obtained by measuring a voltage drop between two ends of the sampling resistor.

The second control circuit 25 averages the current sampling signal $V_{ISEN}$, which is sampled by using a current sampling circuit Rs, to obtain an average sampling signal Vs2 which represents an average current flowing through the load, and generates a switching control signal Vg2 in accordance with the average sampling signal Vs2 and a current reference signal Vref2 which represents a desired output current and the control signal Vg1, for controlling the secondary-side power switch Q2 to maintains an average value of the output current to be constant.

As mentioned above, in the embodiment according to the present disclosure, the second control circuit 25 controls the secondary-side power switch Q2 to be turned on and off so that the freewheeling current flows through the first output circuit 22 and the second output circuit 23 in a time division manner when the primary-side power switch Q1 is turned off to provide multiple constant current/voltage outputs. Meanwhile, a time duration for which the freewheeling current flows through the second output circuit 23 is adjusted to control a value of the output current.

The second control circuit 25 may include an averaging circuit, a second error amplifier circuit EA2, and a second control signal generating circuit 25a. The averaging circuit includes a resistor R and a capacitor C. That is, the averaging circuit is an RC circuit for averaging the current sampling signal $V_{ISEN}$. The average sampling signal Vs2 after being averaged is provided to the second error amplifier circuit EA2. The second error amplifier circuit EA2 generates an error compensation signal Verr2 in accordance with the average sampling signal Vs2 and a current reference signal Vref2. The second control signal generating circuit 25a generates the control signal Vg2 in accordance with the error compensation signal Verr2 and the control signal Vg1, for controlling the secondary-side power switch Q2.

It should be understood that the structure of the second control circuit 25 is shown only as an example. Any control circuit that controls the secondary-side power switch in accordance with the output voltage to provide a constant current output is applicable in the embodiment.

Moreover, in a case of dimming the LED load, i.e. varying a value of the output current, the reference signal Vref2 may be changed to be a desired value by a dimming signal so as to adjust a value of the output current.

Figure 3:
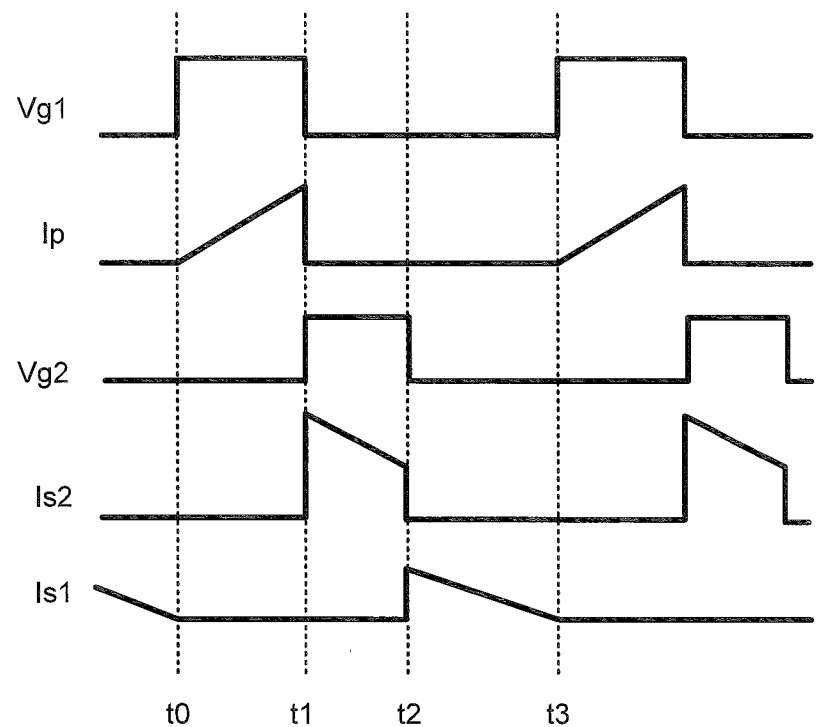
FIG. 3 is an operation waveform diagrams of an example switching converter according to a first embodiment of the present disclosure.

FIG. 3 is an operation waveform diagrams of an example switching converter according to a first embodiment of the present disclosure. As shown in FIG. 3, in a time period from t0 to t1, the control signal Vg1 has a high level, and the primary-side power switch Q1 is turned on. A current Ip through the primary-side winding Np increases from zero. The diodes D1 and D2 in the rectifier circuits of the first output circuit 22 and the second output circuit 23 at the secondary side are reverse biased and in an off state. There is no a current flowing through the two output circuits.

Figure 4:
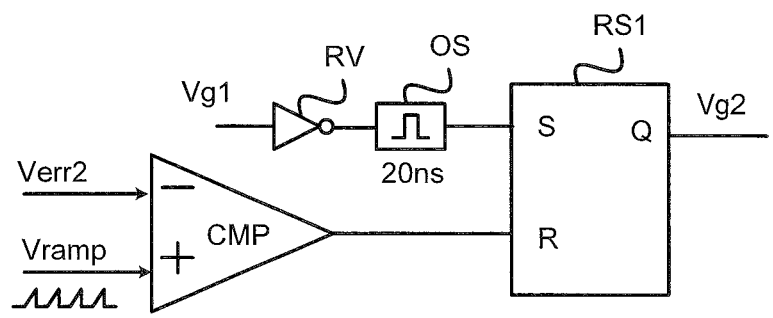
FIG. 4 is a schematic circuit diagram of a second control signal generating circuit according to a second embodiment of the present disclosure.

FIG. 4 is a schematic circuit diagram of a second control signal generating circuit according to a second embodiment of the present disclosure. As shown in FIG. 4, the second control signal generating circuit 25a may include an RS flip-flop RS1, a NOT gate RV, a one-shot circuit OS and a comparator CMP. The NOT gate RV is connected to a SET terminal of the RS flip-flop RS1 through the one-shot circuit OS. Meanwhile, the comparator CMP has input terminals being provided with the error compensation signal Verr2 and a periodic ramp signal Vramp respectively, and an output terminal being connected to a RESET terminal of the RS flip-flop. The one-shot circuit OS outputs a pulse signal with a predetermined duration (for example, 20 ns) when a rising edge of an input signal is detected. Thus, at t1, the control signal Vg1 switches to a low level, and the primary-side power switch Q1 is turned off. The one-shot circuit OS outputs the pulse signal at the time point to reset the RS flip-flop RS1. Thus, the control signal Vg2 switches to a high level, and the secondary-side power switch Q2 is turned on.

In a time period from t1 to t2, the secondary power switch Q2 is turned on. As mentioned above, when the secondary-side power switch Q2 is turned on, energy having been stored in the primary winding is released through the second output circuit 23. The current Is2 through the second secondary-side winding Ns2 decreases continuously from a peak value, and the current Is1 through the first secondary-side winding Ns1 is zero or nearly zero.

At t2, the ramp signal Vramp increases to be a value larger than the error compensation signal Verr2, the RS flip-flop RS1 is reset, and the control signal Vg2 switches to a low level.

In a time period from t2 to t3, the control signal Vg1 maintains to be a low level, and the primary power switch is turned off, while the control signal Vg2 maintains to be a low level, and the secondary power switch Q2 is turned off. In such case, the second output circuit 23 is blocked, and the freewheeling current flows only through the first output circuit 22. The current Is2 through the second secondary-side winding Ns2 is zero, and the current Is1 through the first secondary-side winding Ns1 decreases continuously from a peak value, so that energy is supplied to a voltage output port.

At t3, the control signal Vg1 switches to a high level under control of the first control circuit 24, and the primary-side power switch Q1 is turned on. A new switching cycle starts.

The above cycle repeats, the first control circuit 24 is controlled to maintain an output parameter of the first output circuit 22 (i.e. a constant voltage output circuit) to be stable at a desired output voltage, and the second control circuit 25 is controlled to maintain an output parameter of the second output circuit 23 (i.e. a constant current output circuit) to be stable at a desired output current.

It should be noted that the operation waveform in FIG. 3 and the second control signal generating circuit in FIG. 4 are shown only as examples, the first output circuit 22 and the second output circuit 23 in the embodiment may have different time division of the freewheeling current, but not limited to those discussed above. In another embodiment, the second control circuit 25 may control the secondary power switch Q2 to be turned off firstly so that the freewheeling current flows through the first output circuit 22 firstly, and then controls the secondary power switch Q2 to be turned on so that the freewheeling current then flows through the second output circuit 23.

A secondary-side power switch is connected in series in a second output circuit, and an output voltage of a second secondary-side winding is fed back to a first secondary-side winding with a value less than an output voltage of the first secondary-side winding. Thus, a freewheeling current flows completely through the secondary-side winding of the second output circuit when the secondary-side power switch is turned on, and flows through secondary-side windings of other output circuits when the secondary-side power switch is turned off. The freewheeling current flows in a time division manner in each switching cycle for the constant current output circuit and for the constant voltage output circuit. Only one stage of power conversion is needed for multiple constant current/voltage outputs. The switching mode converter increases conversion efficiency, and reduces size because only one group of magnetic components are used.

It should be understood that although the embodiment has been described with one first output circuit (i.e. a constant voltage output circuit) as examples, the first output circuit (i.e. the constant voltage output circuit) may be more than one. The first control circuit 24 may control the primary-side power switch in accordance with an output voltage of one of first output circuits, or an overall output voltage of the first output circuits.

Further, although the embodiment is described with one second output circuit (i. e. a constant current output circuit) as examples, the second output circuit in the switching mode converter according to the embodiment of the present disclosure may be more than one. Each second output circuit has the same structure. Moreover, the second control circuit includes a plurality of control sub-circuits which controls secondary power switches in the second output circuits respectively, so that freewheeling currents flow simultaneously or in a time division manner through a plurality of second output circuits when the primary-side power switch is turned off, so as to output a constant current.

Figure 5A:
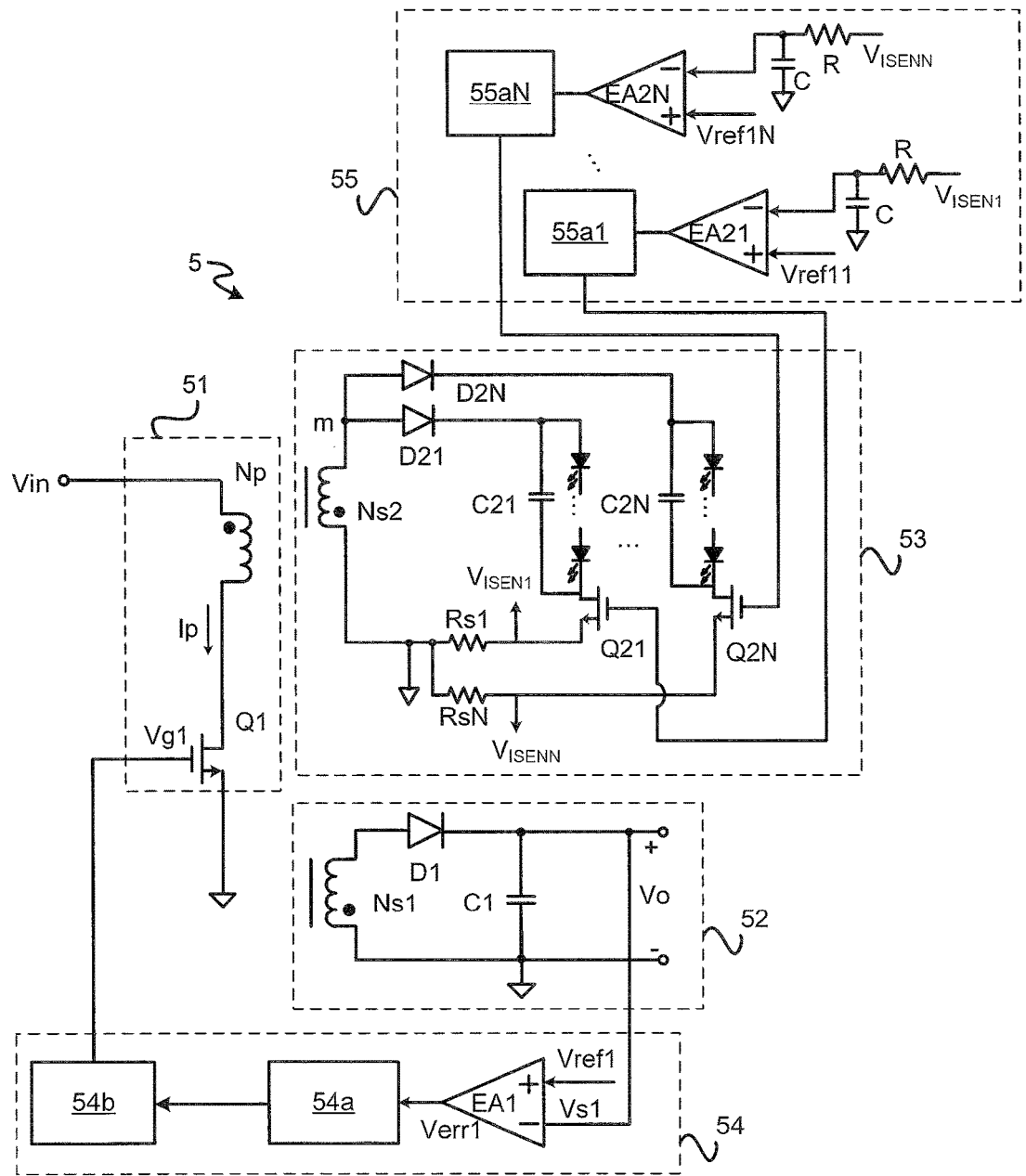
FIG. 5a is a schematic circuit diagram of an example switching mode converter according to a second embodiment of the present disclosure.

FIG. 5a is a schematic circuit diagram of an example switching mode converter according to a second embodiment of the present disclosure. As shown in FIG. 5a, the switching mode converter 5 includes an input circuit 51, at least one first output circuit 52, at least one second output circuit 53, a first control circuit 54 and a second control circuit 55.

The input circuit 51, the first output circuit 52 and the first control circuit 54 have circuit structures the same as those in the first embodiment, and detailed description of which is omitted.

The second output circuit 53 includes a second secondary-side winding Ns2 and at least two output branches. The second output branch 53 is configured to feed back an output voltage of the second secondary-side winding Ns2 to the first secondary-side winding Ns1 with a value less than an output voltage of the first secondary-side winding Ns1. Each of the two output branches comprises a current output port, a second rectifier circuit being electrically coupled between the current output port and a branch input m, and a current sampling circuit Rsi (i=1~N, N is an integer larger than or equal to 2) and a secondary power switch Q2$i$ which are connected in series with each other in the output branch. All of the output branches are connected in parallel between two ends of the second secondary-side winding Ns2. That is, all of the output branches have a common second secondary-side winding Ns2. When any number of the second secondary power switches Q2$i$ are turned on, a freewheeling current is generated in the second secondary-side winding Ns2 and flows through respective one of the output branches so as to drive respective one LED load. By controlling on time of the secondary power switch Q2$i$ of the respective one of the output branches, the output branches can drive LED loads to have different levels of brightness.

Specifically, in the second output circuit 53 shown in FIG. 5a, the current sampling resistor Rsi is a sampling resistor which is connected between ground (i.e. a dotted terminal of the second secondary-side winding Ns2) and a first terminal of the secondary-side power switch Q2$i$. The secondary-side power switch Q2$i$ is connected to a second terminal of the current output port. The LED load is connected to respective one of the current output ports. The second rectifier circuit includes a diode D2$i$ and a capacitor C2$i$. It should be understood that the above connections are not exclusive and may be varied so long as that the secondary-side power switch Q2$i$ and the current sampling circuit Rsi are connected in series in the output branch.

In a preferable embodiment, the second control circuit 55 may include a plurality of control sub-circuits. Each control sub-circuit control circuit averages a current sampling signal $V_{ISENi}$, which is obtained by sampling with a current sampling circuit Rsi in respective one of the output branches, to obtain an average sampling signal Vs2i which represents an average current flowing through the LED load which is driven by the respective one of the output branches, and generates a switching control signal Vg2i in accordance with the average sampling signal Vs2i and a current reference signal Vref2i which represents a desired output current of the respective one of the output branches and the control signal Vg1. The switching control signal Vg2i controls respective one secondary-side power switch Q2i so that the respective one of the output branches provides an output current having a constant average value. The freewheeling current may be provided simultaneously or in a time division manner for different control sub-circuits.

Each control sub-circuit may include an average circuit, a second error amplifier circuit EA2i, and a second control signal generating circuit 55ai. In the embodiment, the averaging circuit may be an RC circuit. Preferably, the second control signal generating circuit 55ai may be implemented with a circuit structure shown in FIG. 4. It should be understood that the structure of the second control circuit 55i is shown only as an example. Any control circuit that controls the secondary-side power switch in accordance with the output voltage to provide a constant current output is applicable in the embodiment.

In a case of dimming the LED load, the reference signal Vref2i may be changed independently for each control sub-circuit 55i to be a desired value.

In such manner, each output branch may be independently controlled to provide an independent output current in a complex dimming scheme.

In another preferable embodiment, when all of the loads are identical ones, all of the secondary power switches Q2i may be controlled in accordance with an output current of one output branch. Thus, the control circuit may be simplified.

In the embodiment, the second output circuit (i.e. a constant current output circuit) is provided with a plurality of output branches which have a common second secondary-side winding. The second output circuit provides multiple constant current outputs while no additional magnetic component is needed, which reduces size of a constant current circuit having a plurality of outputs.

It should be understood that although the embodiment has been described with one first output circuit as an example, the first output circuit (i.e. the constant voltage output circuit) may be more than one. The first control circuit 54 may control the primary-side power switch in accordance with an output voltage of one of first output circuits, or an overall output voltage of the first output circuits.

Further, although the embodiment is described with one second output circuit as an example, the second output circuit (i. e. a constant current output circuit) may be more than one. Each second output circuit has the same structure. Moreover, the second control circuit includes a plurality of control sub-circuits which controls secondary power switches in the second output circuits respectively, so that freewheeling currents flow simultaneously or in a time division manner through a plurality of second output circuits when the primary-side power switch is turned off, so as to output a constant current.

Figure 5B:
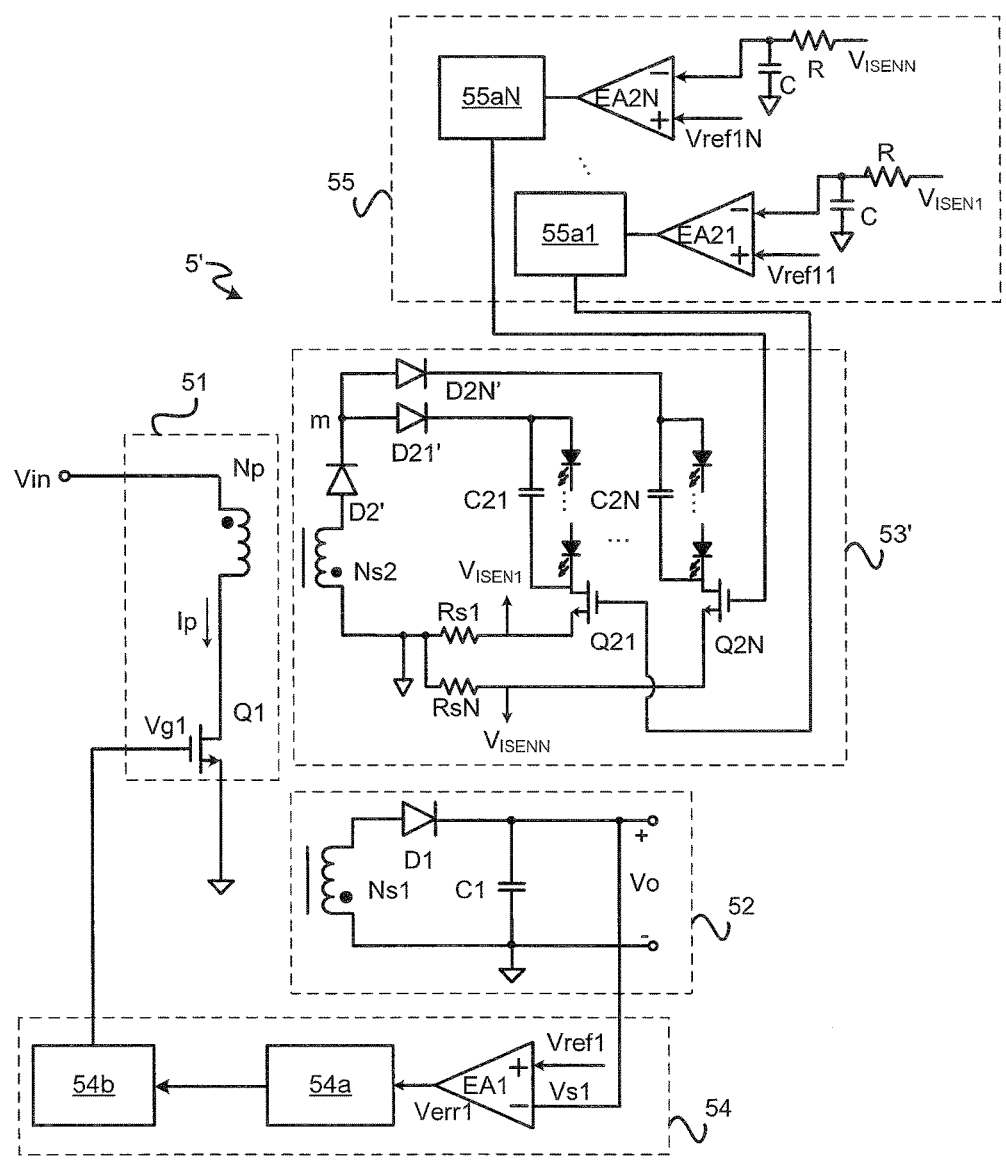
FIG. 5b is a schematic circuit diagram of variation of an example switching mode converter according to a second embodiment of the present disclosure.

FIG. 5b is a schematic circuit diagram of variation of an example switching mode converter according to a second embodiment of the present disclosure. As shown in FIG. 5b, the second output circuit 53 ' includes a second secondary-side winding Ns2, and at least two output branches, and a rectifier diode D2' which is connected in series with the second secondary-side winding Ns2. Each of the two output branches comprises a current output port, a second rectifier circuit being electrically coupled between the current output port and a branch input m, and a current sampling circuit Rsi (i=1~N, N is an integer larger than or equal to 2) and a secondary power switch Q2i which are connected in series with each other in the output branch. All of the output branches are connected in parallel between two ends of the second secondary-side winding Ns2. That is, all of the output branches have a common second secondary-side winding Ns2. When any number of the second secondary power switches Q2i are turned on, a freewheeling current is generated in the second secondary-side winding Ns2 and flows through respective one of the output branches so as to drive respective one LED load. By controlling on time of the secondary power switch Q2i of the respective one of the output branches, the output branches can drive LED loads to have different levels of brightness. The rectifier diode D2' is a high-voltage diode. By using the rectifier diode D2', the diode D2i' in the rectifier circuit of each output branch can be a low-voltage diode, instead of being a high-voltage diode in the circuit structure as shown in FIG. 5a. It will thus reduce cost.

Figure 6:
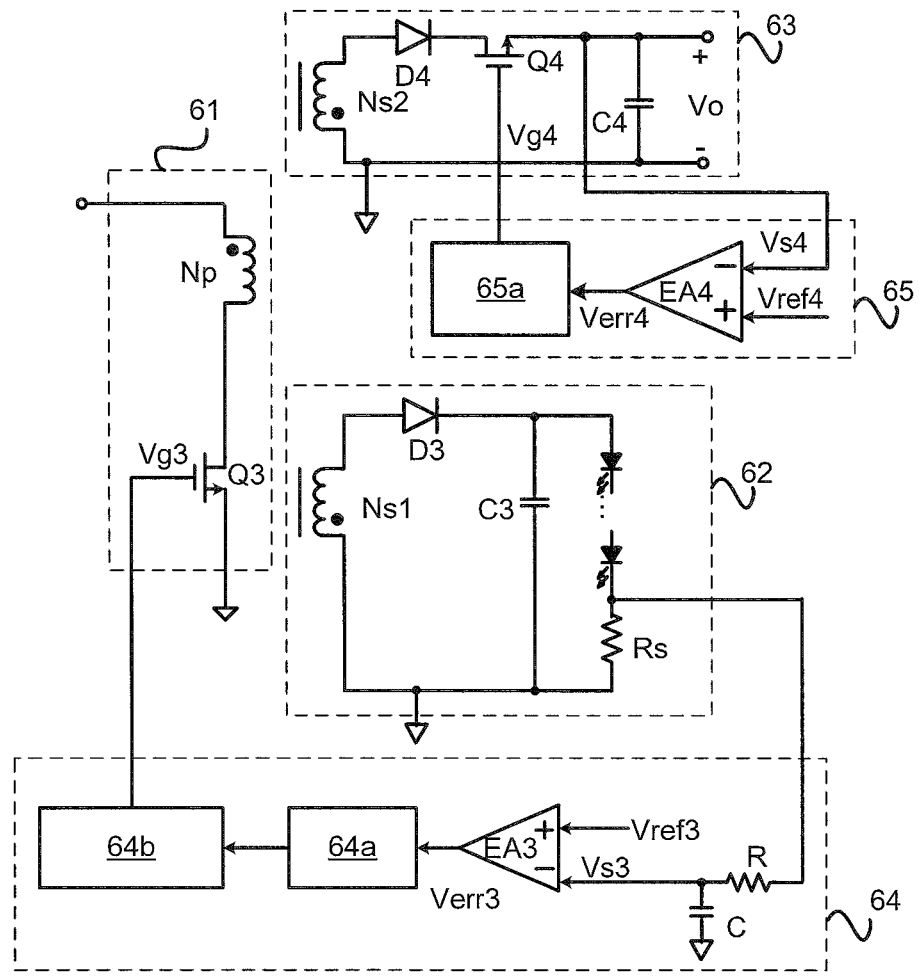
FIG. 6 is a schematic circuit diagram of an example switching mode converter according to a third embodiment of the present disclosure.

FIG. 6 is a schematic circuit diagram of an example switching mode converter according to a third embodiment of the present disclosure. As shown in FIG. 6, the switching mode converter 6 includes an input circuit 61, a first output circuit 62, at least one second output circuit 63, a first control circuit 64 and a second control circuit 65.

The input circuit 61 has a circuit structure the same as that in the above-mentioned embodiment, detailed description of which is omitted.

The third embodiment is different from the first embodiment and the second embodiment in that the first output circuit 62 is a constant current output circuit, and is the only one, and the second output circuit 63 is a constant voltage output circuit.

In the embodiment, the first output circuit 62 includes a first secondary-side winding Ns1, a current output port, a first rectifier circuit, a current sampling circuit Rs. The first rectifier circuit is connected between the first secondary-side winding Ns1 and the current output port, includes a diode D3 which is connected between the first secondary-side winding Ns1 and one terminal of the current output port and a capacitor C3 which is connected in parallel at the current output port. The current output port connects a load of the constant current circuit. In the embodiment, the load is an LED load. Preferably, the current sampling circuit Rs is a sampling resistor which is connected between ground (i.e. a dotted terminal of the first secondary-side winding Ns1) and another terminal of the current output port. That is, the current sampling signal $V_{ISEN}$ can be obtained directly at one terminal of the sampling circuit for representing an output current, without the need for additional circuit components. The current sampling circuit may be connected in series with the current output port, or with the first secondary-side winding Ns1.

The first control circuit 64 is a constant current control circuit. The first control circuit 64 averages the current sampling signal $V_{ISEN}$, which is sampled by using a current sampling circuit Rs, to obtain an average sampling signal Vs3 which represents an average current flowing through the LED load, and generates a switching control signal Vg3 in accordance with the average sampling signal Vs3 and a current reference signal Vref3 which represents a desired output current, for controlling the primary-side power switch Q3 to maintains an output current of the first output circuit 62 to be constant.

Moreover, in a case of dimming the LED load, i.e. varying a value of the output current, the current reference signal Vref3 may be changed to be a desired value by a dimming signal so as to adjust a value of the output current.

The first control circuit 64 may include an averaging circuit, a first error amplifier circuit EA3, an optocoupler circuit 64a, and a first control signal generating circuit 64b. The averaging circuit 64a includes a resistor R and a capacitor C. That is, the averaging circuit is an RC circuit for averaging the current sampling signal $V_{ISEN}$. The average sampling signal Vs3 after being averaged is provided to the first error amplifier circuit EA3. The first error amplifier circuit EA3 generates an error compensation signal Verr3 in accordance with the average sampling signal Vs3 and a current reference signal Vref3. The optocoupler circuit 64a transfers the error compensation signal Verr3 from the secondary side to the primary side, specifically to the first control signal generating circuit 64b, in an optocoupling manner. The first control signal generating circuit 64b generates the control signal Vg3 in accordance with the error compensation signal Verr1, for controlling the power switch Q3.

It should be understood that the structure of the first control circuit 64 is shown only as an example. Any control circuit that controls the primary-side power switch in accordance with the current sampling signal to provide a constant current output is applicable in the embodiment.

The second output circuit 63 includes a second secondary-side winding Ns2, a voltage output port, a secondary-side power switch Q4, and a diode D4 and a capacitor C4 for rectifying and filtering. The diode D4 is connected in series with the secondary-side power switch Q4 between the voltage output port and the second secondary-side winding Ns2. The capacitor C4 is connected in parallel at the voltage output port. The secondary-side power switch Q4 is controlled to be turned on and off so that a voltage at the output terminal maintains constant.

Specifically, the second control circuit 65 obtains a voltage sampling signal Vs4 by sampling the output voltage Vo, obtains an error compensation signal Verr4 in accordance with the voltage reference signal Vref4 which represents the output voltage and the voltage sampling signal Vs4, and generates a switching control signal Vg4 in accordance with the error compensation signal Verr4, for controlling the secondary-side power switch Q4.

The second control circuit 65 may include a second error amplifier circuit EA4, and a second control signal generating circuit 65a. The second error amplifier circuit EA4 generates the error compensation signal Verr4 in accordance with the voltage reference signal Vs4 which represents a desired output voltage and the voltage sampling signal Vref4. The second control signal generating circuit 65a generates the control signal Vg4 in accordance with the error compensation signal Verr4, for controlling the secondary-side power switch Q4.

In such manner, the secondary-side power switch Q2 is controlled to be turned on and off, so that a time duration for which the freewheeling current flows through the second output circuit in each switching cycle is adjusted to control energy into the second output circuit. Thus, the output voltage is maintained to be constant.

In the embodiment, the second output circuit is a constant voltage output circuit which provides a plurality of constant voltage outputs and a single constant current output using only one magnetic component (i.e. a transformer). Thus, the system efficiency is increased while the size of the system is reduced.

Further, although the embodiment is described with one second output circuit as an example, the second output circuit (i.e. a constant voltage output circuit) may be more than one. Each second output circuit has the same structure. Moreover, the second control circuit includes a plurality of control sub-circuits which controls secondary power switches in the second output circuits respectively, so that freewheeling currents flow simultaneously or in a time division manner through a plurality of second output circuits when the primary-side power switch is turned off, so as to output a constant voltage.

Figure 7:
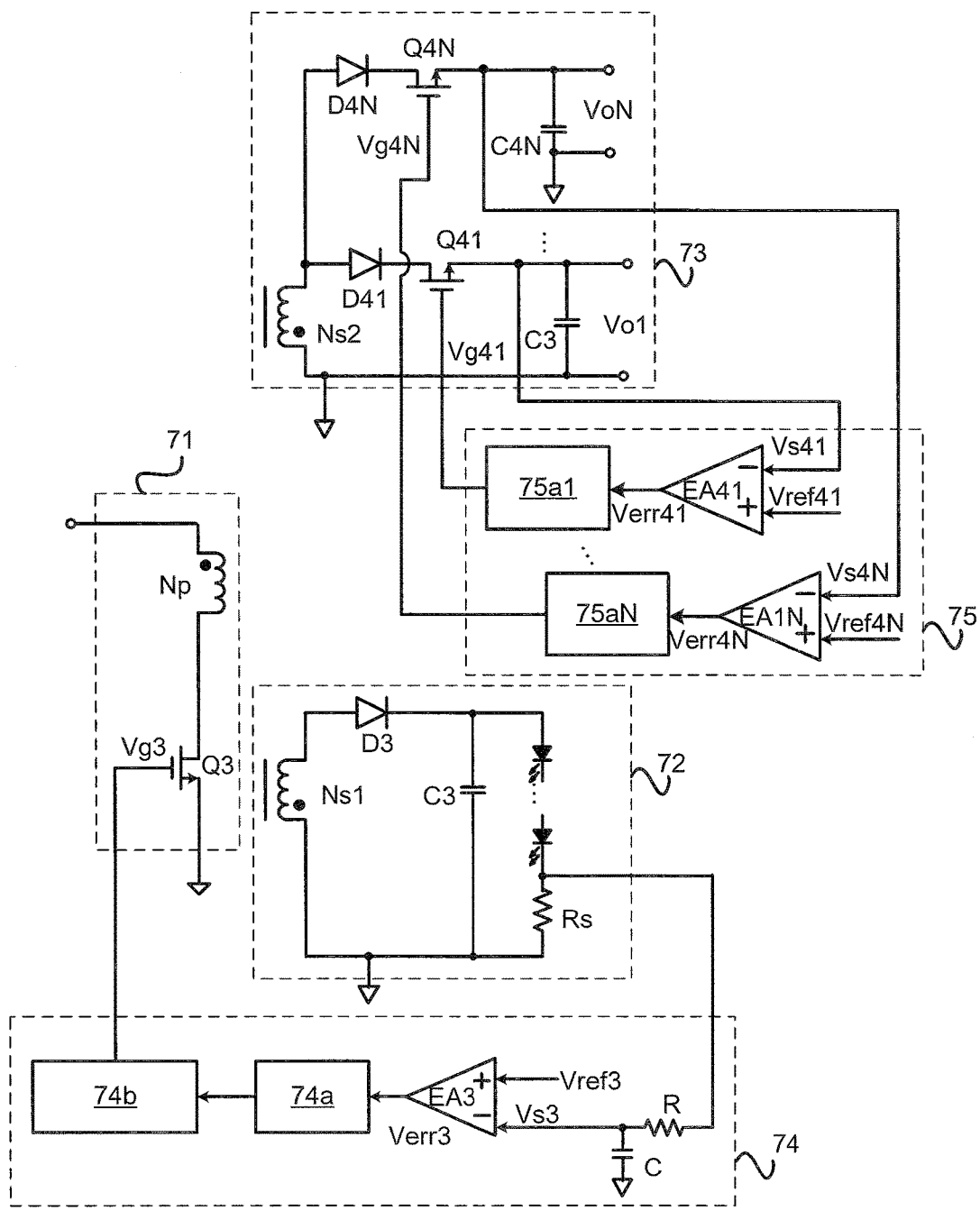
FIG. 7 is a schematic circuit diagram of an example switching mode converter according to a fourth embodiment of the present disclosure.

FIG. 7 is a schematic circuit diagram of an example switching mode converter according to a fourth embodiment of the present disclosure. As shown in FIG. 7, the switching mode converter 7 includes an input circuit 71, a first output circuit 72, at least one second output circuit 73, a first control circuit 74 and a second control circuit 75.

The input circuit 71, the first output circuit 72 and the first control circuit 74 have structures the same as those in the third embodiment, and detailed description of which is omitted.

In the embodiment, the second output circuit 73 is also a constant voltage output circuit. However, the fourth embodiment is different form the third embodiment in that the second output circuit 73 includes a plurality of output branches besides a second secondary-side winding Ns2. Each output branch comprises a voltage output port, a diode D4i (i=1~N, N is an integer larger than or equal to 2) and a secondary-side power switch Q4i which are connected in series between the voltage output port and an output branch input, and a capacitor C4i which is connected in parallel at the voltage output port. All of the output branches are connected in parallel between two ends of the second secondary-side winding Ns2.

The secondary-side power switch Q4i is controlled to be turned on and off, which further conducts or blocks respective one of the output branches, so that an output voltage of the respective one of the output branches maintains constant.

When any number of the second secondary power switches Q4i are turned on, a freewheeling current is generated in the second secondary-side winding Ns2 and flows through the respective one of the output branches so as to drive respective one load. By controlling on time of the secondary power switch Q2i of the respective one of the output branches, the output branches can provide different and stable output voltages.

In a preferable embodiment, the second control circuit 75 may include a plurality of control sub-circuits. Each control sub-circuit generates a switching control signal Vg4i in accordance with a voltage sampling signal Vs4i and a voltage reference signal Vref4i which represents a desired output voltage of respective one of the output branches and the control signal Vg3. The switching control signal Vg4i controls respective one secondary-side power switch Q4i so that the respective one of the output branches provides a stable output voltage.

Each control sub-circuit may include a second error amplifier circuit EA4i, and a second control signal generating circuit 75ai. Preferably, the second control signal generating circuit 75ai may be implemented with a circuit structure shown in FIG. 4. It should be understood that the structure of the second control circuit is shown only as an example. Any control circuit that controls the secondary-side power switch in accordance with the output voltage to provide a constant current output is applicable in the embodiment.

In such manner, each output branch may be independently controlled to provide an independent output voltage.

In another preferable embodiment, when all of the loads of the second output circuit 73 are identical ones, all of the secondary power switches Q4i may be controlled in accordance with an output voltage of one output branch. Thus, the control circuit may be simplified.

In the embodiment, the second output circuit (i.e. a constant voltage output circuit) is provided with a plurality of output branches which have a common second secondary-side winding. The second output circuit provides multiple constant current outputs while no additional magnetic component is needed, which reduces size of a constant current circuit having a plurality of outputs.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

The invention claimed is:

1. A switching mode converter, comprising:
   an input circuit having a primary-side winding and a primary-side power switch which are coupled in series between an input terminal and ground;
   at least one first output circuit having a first secondary-side winding which is coupled with said primary-side winding;
   at least one second output circuit having a second secondary-side winding which is coupled with said primary-side winding, and at least one secondary-side power switch;
   a first control circuit which controls said primary-side power switch to be turned on and off to adjust an output parameter of said first output circuit; and
   a second control circuit which controls said secondary-side power switch to be turned on and off to adjust an output parameter of said second output circuit,
   wherein said first output circuit and said second output circuit are configured so that said second secondary-side winding feeds back a voltage to said first secondary-side winding with a value less than an output voltage of said first secondary-side winding so that said first output circuit is blocked when said secondary-side power switch is turned on.

2. The switching power converter according to claim 1, wherein said primary-side power switch and said secondary-side power switch have the same switching cycle,
   said second control circuit controls said secondary-side power switch to be turned on for at least a portion of time period during which said primary-side power switch is turned off, so that said output parameter of said second output circuit maintains constant.

3. The switching mode converter according to claim 1, wherein said second output circuit is a constant current output circuit, and further comprising:
   a current output port;
   a second rectifier circuit being electrically coupled between said current output port and said second secondary-side winding; and
   a current sampling circuit being connected in series with said second secondary-side winding,
   wherein said secondary-side power switch is connected in series with said second secondary-side winding, and is controlled to be turned on and off so that an output current maintains constant.

4. The switching converter according to claim 3, wherein said second control circuit is configured to generate a second control signal for controlling said secondary-side power switch in accordance with a current sampling signal, a current reference signal and a first control signal,
   wherein said current sampling signal is provided by said current sampling circuit, said first control signal controls said primary-side power switch, and said current reference signal represents a desired value of said output current.

5. The switching mode converter according to claim 4, wherein said second control circuit is further configured to adjust said current reference signal in accordance with a current value adjustment signal.

6. The switching mode converter according to claim 3, wherein said first output circuit is a constant voltage output circuit, and further comprising:
   a voltage output port; and
   a first rectifier circuit being electrically coupled between said voltage output port and said first secondary-side winding,
   wherein said primary-side power switch is controlled to be turned on and off so that an output voltage of said first output circuit maintains constant.

7. The switching mode converter according to claim 1, wherein said second output circuit is a constant current output circuit, and further comprising:
   said second secondary-side winding; and
   at least two output branches, each of which comprises a current output port, a second rectifier circuit being electrically coupled between said current output port and a branch input, and a current sampling circuit and said secondary-side power switch which are connected in series with said output branch,
   wherein said at least two output branches are connected in parallel between two ends of said second secondary-side winding,
   said secondary-side power switch is controlled to be turned on and off so that an output current of respective one of said at least two output branches maintains constant.

8. The switching converter according to claim 7, wherein said second control circuit comprises at least two control sub-circuits, each of which is configured to generate a second control signal for controlling respective one secondary-side power switch in accordance with a current sampling signal of respective one of said at least two output branches, a current reference signal and a first control signal,
   wherein said current sampling signal is provided by respective one current sampling circuit, said first control signal controls said primary-side power switch, and said current reference signal represents a desired value of an output current of respective one of said at least two output branches, and wherein said control sub-circuits have the same number as that of said output branches.

9. The switching mode converter according to claim 1, wherein said second output circuit further comprising:
   a rectifier diode which is a high-voltage rectifier diode and is connected in series with said second secondary-side winding.

10. The switching mode converter according to claim 1, wherein said second output circuit is a constant voltage output circuit, and further comprising:
- a voltage output port;
- a rectifier diode being connected in series with said secondary-side power switch between said voltage output port and said second secondary-side winding; and
- a filter capacitor being connected in parallel at said voltage output port,
- wherein said secondary-side power switch is controlled to be turned on and off so that an output voltage of said output terminal maintains constant.

11. The switching converter according to claim 10, wherein said second control circuit is configured to generate a second control signal for controlling said secondary-side power switch in accordance with a voltage sampling signal, a voltage reference signal and a first control signal,
- wherein said voltage sampling signal represents said output voltage, said first control signal controls said primary-side power switch, and said voltage reference signal represents a desired value of said output voltage.

12. The switching mode converter according to claim 10, comprising only one first output circuit which is a constant current output circuit and further comprises:
- a current output port;
- a first rectifier circuit being electrically coupled between said first secondary-side winding and said current output port; and
- a current sampling circuit being connected in series with said first secondary-side winding,
- wherein said primary-side power switch is controlled to be turned on and off so that an output current maintains constant.

13. The switching mode converter according to claim 12, wherein said first control circuit is further configured to adjust said current reference signal in accordance with a current value adjustment signal.

14. The switching mode converter according to claim 1, wherein said second output circuit is a constant voltage output circuit, and further comprising:
- said second secondary-side winding; and
- at least two output branches, each of which comprises a voltage output port, a rectifier diode and said secondary-side power switch which are connected in series between said voltage output port and an output branch input, and a filter capacitor being connected in parallel at said voltage output port,
- wherein said at least two output branches are connected in parallel between two ends of said second secondary-side winding,
- said secondary-side power switch is controlled to be turned on and off so that an output voltage of respective one of said at least two output branches maintains constant.

15. The switching converter according to claim 14, wherein said second control circuit comprises at least two control sub-circuits, each of which is configured to generate a second control signal for controlling respective one secondary-side power switch in accordance with a voltage sampling signal of respective one of said at least two output branches, a voltage reference signal and a first control signal,
- wherein said voltage sampling signal represents an output voltage of respective one of said at least two output branches, said first control signal controls said primary-side power switch, and said voltage reference signal represents a desired value of said output voltage of respective one of said at least two output branches, and
- wherein said control sub-circuits have the same number as that of said output branches.

\* \* \* \* \*